United States Patent [19]
Wajtkowicz

[11] 4,333,636
[45] Jun. 8, 1982

[54] CUTTING-TORCH HOLDER

[75] Inventor: Joseph A. Wajtkowicz, Pasadena, Md.

[73] Assignee: Bethlehem Steel Corporation, Bethlehem, Pa.

[21] Appl. No.: 215,192

[22] Filed: Dec. 10, 1980

[51] Int. Cl.³ .............................................. B23K 7/10
[52] U.S. Cl. ...................................... 266/68; 266/76; 266/77
[58] Field of Search ...................... 266/67, 68, 69, 71, 266/72, 54, 76, 77

[56] References Cited
U.S. PATENT DOCUMENTS

| | | | |
|---|---|---|---|
| 2,271,613 | 2/1942 | Babcock et al. | 266/68 |
| 2,293,853 | 8/1942 | Rountree | 266/68 |
| 2,297,343 | 9/1942 | Young | 266/68 |
| 2,373,541 | 4/1945 | Chelborg et al. | 266/77 |
| 2,574,100 | 11/1951 | Gettys et al. | 266/68 |
| 2,665,900 | 1/1954 | Begerow | 266/76 |

Primary Examiner—John P. Sheehan
Attorney, Agent, or Firm—Joseph J. O'Keefe; Michael J. Delaney

[57] ABSTRACT

Apparatus for automatically maintaining a cutting torch a predetermined distance from an uneven work surface having transverse and longitudinal irregularities includes a slide member which is adapted to move in a vertical direction in response to such irregularities and is pivotally attached to a support arm, roller means ride on and traverse the uneven work surface, the support arm is attached to the roller means and a cutter torch is fixed in a holder vertically, adjustably attached to the support arm.

1 Claim, 3 Drawing Figures

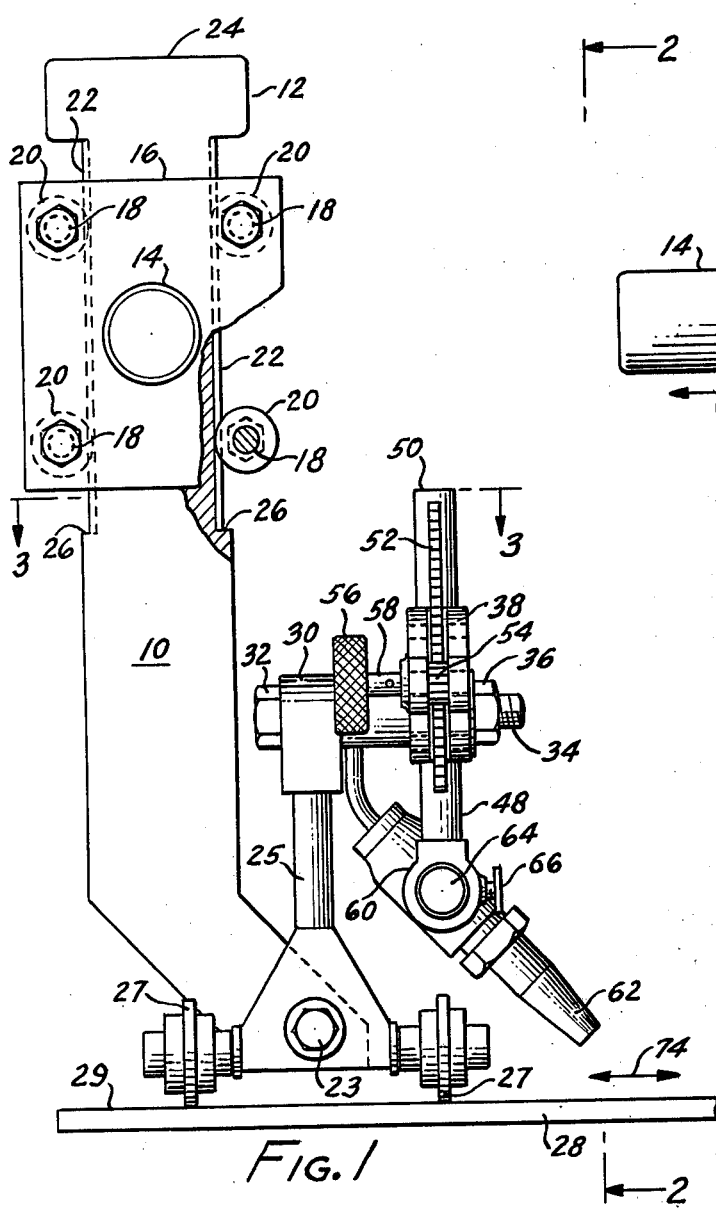
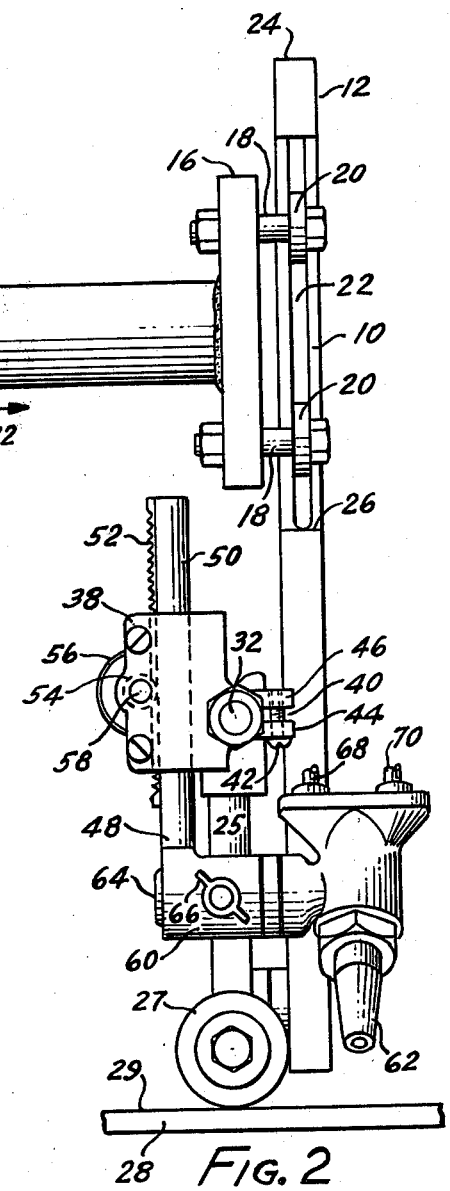
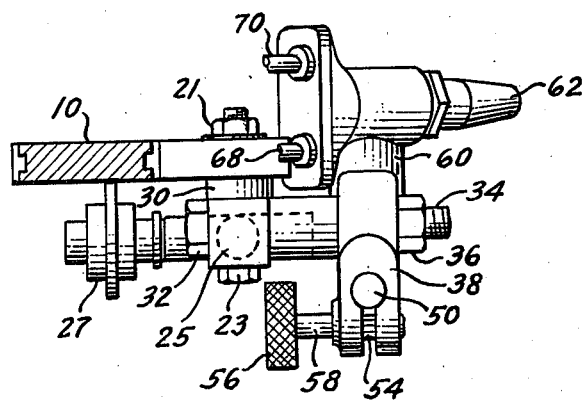

CUTTING-TORCH HOLDER

BACKGROUND OF THE INVENTION

Steel plates and other plate surfaces are seldom perfectly flat, but have irregularities which extend in both the longitudinal and transverse directions of the plate or in a combination of such directions. Such irregularities may be caused by warpage or result from heating, rolling and/or quenching operations during processing of the plate. These irregularities may manifest themselves as undulations which extend across the width and/or the length of the plate.

Steel plates and the like are often cut or beveled by using a flame cutting means such as blowpipes, cutting torches, flame-severing, flame-beveling, oxygen burner, oxyacetylene or the like. Ordinarily the flame cutting means is attached to an arm which in turn is attached to a carriage. The carriage moves along a track or templet dependent on the particular shape to be cut from the plate.

During a flame cutting or beveling operation the distance between the flame cutter and the work to be cut should remain relatively constant as the flame cutter moves relative to the work. Obviously if the work surface includes undulations or irregularities such distance may vary. As a result the efficiency and accuracy may be adversely affected by varying the distance between the flame cutter and the work surface.

SUMMARY OF THE INVENTION

It is an object of this invention to provide apparatus that accurately and efficiently allows a plate to be cut or beveled.

It is another object of this invention to provide apparatus that automatically allows a flame cutter to maintain a predetermined distance from a work surface.

It is still another object of this invention to provide apparatus that automatically allows a flame cutter to adjust to undulation or irregularities in a work surface.

Still further objects of this invention will become apparent from a reading of the following description and claims.

The above objects can be accomplished by providing an apparatus that includes a slide member having its upper end slidably attached to an arm member and its lower end pivotally attached to a support arm, roller means which rides on a work surface, the support arm extends upwardly from the roller means and is fixedly attached thereto, and holder means attached to the support arm for holding flame cutting means.

BRIEF DESCRIPTION OF THE DRAWINGS

FIG. 1 is an elevation view of the apparatus of this invention.
FIG. 2 is a view taken along the lines 2—2 of FIG. 1.
FIG. 3 is a view taken along the lines 3—3 of FIG. 1.

DETAILED DESCRIPTION OF THE DRAWINGS

Referring to FIGS. 1 and 2, the apparatus of this invention includes a slide member 10 having a T-shaped upper end 12 slidably attached to horizontally extending arm member 14 which has a vertically extending mounting plate 16 fixedly attached to the end of arm member 14. Arm member 14 is attached to means (not shown), such as a carriage, for providing horizontal movement to arm member 14. Such means is well known in the art. Attached to mounting plate 16 and extending horizontally therefrom are four bolts 18. Rotatably attached to the outer ends of bolts 18 are four grooved rollers 20 which ride on tracks 22 in slide member 10. Horizontal portion 24 of slide member 10 limits the downward movement of slide member 10 relative to arm member 14 while shoulder 26 on slide member 10 limits the upward movement of slide member 10 relative to arm member 14.

Referring to FIGS. 1 and 3, the lower end of slide member 10 is pivotally attached to vertically extending support arm 25 by means of bolt 23 and nut 21. Support arm 25 has attached hereto a pair of rollers 27 which ride along the work surface 29 of a sheet or plate 28.

Referring to FIGS. 1, 2 and 3, the upper end of support arm 25 includes an integral portion 30 which extends substantially horizontal. Extending through integral portion 30 is a bolt 32 having threaded portion 34 for receipt of a nut 36. Attached to bolt 32 is holder means for a cutting torch 62 including a housing 38 having a bifurcated portion 40. Bolt 42 passes through one leg 44 of bifurcated portion 40 and is in threaded engagement with a tapped hole in the other leg 46 of bifurcated portion 40 such that upon tightening bolt 42 the housing 38 is fixedly attached to bolt 32. Passing through a vertically extending opening in housing 38 is an L-shaped member 48. The upright leg 50 of the L-shaped member 48 includes an integral rack 52 which is engaged by pinion 54 attached to and rotable with knurled wheel 56 fixedly mounted on shaft 58. Thus by turning knurled wheel 56 pinion 54 is rotated and rack 52 is moved in response to the teeth of pinion 54 driving the teeth of rack 52. Attached to the horizontal leg 60 of L-shaped member 48 is a cutting torch 62. The cutting torch 62 is attached to a shaft 64 which passes within horizontal leg 60 and thumb screw 66 which is in threaded engagement with a threaded hole in horizontal leg 60 releasably holds and allows shaft 64 to be adjusted within horizontal leg 60. Such adjustment allows cutting torch 62 to be properly positioned relative to work surface 29. Attached to cutting torch 62 are the usual gas and oxygen hoses 68,70.

Operation

In operation and referring to FIGS. 1 and 2, with rollers 27 in contact with work surface 29 cutting torch 62 is properly positioned by rack 52 and pinion 54 with respect to height and by thumb screw 66 and shaft 64 with respect to the angle the flame of cutting torch impacts upon the work surface 29, such that the flame will efficiently sever or bevel the workpiece.

Next the arm member 14 is moved by means not shown, in a horizontal plane in the direction of arrow 72 of FIG. 2 to drive the rollers 27 along the work surface 29 while the cutting 62 torch performs a cutting operation. As the rollers 27 ride on the work surface 29 any irregularities in the work surface 29 which extend in the same direction as indicated by arrow 72 will cause the slide member 10 to move upwardly or downwardly relative to arm member 14 as the slide member 10 rides against rollers 20.

As the rollers 27 ride on the work surface 29 any irregularities in the work surface which extend in the direction of the arrow 74 of FIG. 1 will cause support arm 25 to rotate or pivot with respect to slide member 10.

As the rollers 27 ride on the work any irregularities in the work surface 29 which extent in a direction other than the direction shown by arrows 72 and 74 both the slide member 10 will move relative to arm member 14 and support arm 25 will rotate or pivot with respect to slide member 10.

Regardless of the direction in which the irregularities in the work surface 29 extend the end of the cutting torch 62 will remain at a fixed distance from the work surface 29.

Although I have described my invention hereinabove in considerable detail, I do not wish to be limited narrowly to the exact and specific particulars disclosed, but I may also use such substitutes, modifications, or equivalents as are included within the scope and spirit of the invention or pointed out in the appended claims.

I claim:

1. Apparatus adapted to automatically maintain flame cutting means a predetermined distance from a work surface as the flame cutting means moves relative to a work surface comprising:
   (a) a slide member having its upper end slidably attached for vertical movement to an arm member and its lower end pivotally attached to a support arm by horizontally extending pivot means so that said support arm is adapted to rotate about said pivot means in a substantially vertical plane,
   (b) holder means attached to said support arm for securing said flame cutting means to said support arm,
   (c) said holder means comprising an L-shaped member having integral rack means on its vertical leg in mating contact with pinion means on said support arm for vertically adjusting said flame cutting means and pivot means on its horizontal leg for adjusting the angle at which the flame cutting means impacts the work surface, and
   (d) roller means attached to said support arm whereby as the roller means rides on said work surface said slide member moves vertically relative to said arm member and said support arm rotates in a vertical plane about said horizontally extending pivot means relative to said slide member in response to irregularities in said work surface.

* * * * *